United States Patent
Gao et al.

(10) Patent No.: US 11,567,753 B1
(45) Date of Patent: Jan. 31, 2023

(54) AUTOMATED SOFTWARE PATCH MAPPING AND RECOMMENDATION

(71) Applicant: INTERNATIONAL BUSINESS MACHINES CORPORATION, Armonk, NY (US)

(72) Inventors: Lei Gao, Xian (CN); Yan Liu, Xian (CN); Bo Shen, Xian (CN); Zhen Liu, Xian (CN); Kai Li, Xian (CN); Jin Wang, Xian (CN); A Peng Zhang, Xian (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/462,263

(22) Filed: Aug. 31, 2021

(51) Int. Cl.
*G06F 8/65* (2018.01)
*G06N 20/00* (2019.01)
*G06F 11/36* (2006.01)

(52) U.S. Cl.
CPC ............ *G06F 8/65* (2013.01); *G06F 11/3684* (2013.01); *G06N 20/00* (2019.01)

(58) Field of Classification Search
CPC ........ G06F 8/65; G06F 11/3684; G06N 20/00
(Continued)

(56) References Cited

U.S. PATENT DOCUMENTS

| 7,251,812 | B1 | 7/2007 | Jhanwar et al. |
| 7,937,697 | B2 | 5/2011 | Alberti et al. |

(Continued)

FOREIGN PATENT DOCUMENTS

| CN | 111857771 | 6/2020 |
| CN | 111897946 | 7/2020 |

OTHER PUBLICATIONS

Toro-Betancur et al., "A Scalable Software Update Service for IoT Devices in Urban Scenarios", 2019, [Online], pp. 1-8, [Retrieved from internet on Sep. 16, 2022], <https://dl.acm.org/doi/pdf/10.1145/3365871.3365880> (Year: 2019).*

(Continued)

*Primary Examiner* — S. Sough
*Assistant Examiner* — Zengpu Wei
(74) *Attorney, Agent, or Firm* — David Mattheis; Andrew D. Wright; Calderon Safran & Cole, P.C.

(57) ABSTRACT

Systems and methods are provided to recommend software patches based on task operation mapping. In embodiments, a method includes abstracting test cases for a software patch into a sequence of task operations and parameters associated with each task operation; encoding the task operations and the parameters associated with each task operation based on predetermined rules, thereby generating encoded task operations with unique identifiers assigned thereto and associated encoded parameters with numeric values assigned thereto; generating, using machine learning, a list of frequent operation items, based on the encoded task operations and the associated encoded parameters; generating, using clustering, clusters of parameters for each frequent operation item in the list of frequent operation items; and sending a software patch package including the list of frequent operation items, the clusters of parameters and the software patch to a remote server for distribution to one or more user devices.

20 Claims, 13 Drawing Sheets

(58) Field of Classification Search
USPC .......................................................... 717/173
See application file for complete search history.

(56) References Cited

U.S. PATENT DOCUMENTS

| | | |
|---|---|---|
| 9,003,387 B2 | 4/2015 | Van Camp et al. |
| 2007/0214215 A1 | 9/2007 | McCaleb et al. |
| 2014/0012797 A1 | 1/2014 | Rao et al. |
| 2014/0282371 A1* | 9/2014 | Hirsch ...................... G06F 8/65 717/106 |
| 2017/0039133 A1* | 2/2017 | Rai ..................... G06F 11/3692 |
| 2019/0227787 A1 | 7/2019 | Kumar et al. |
| 2020/0057625 A1 | 2/2020 | Livne et al. |

OTHER PUBLICATIONS

Mell et al., "The NIST Definition of Cloud Computing", NIST, Special Publication 800-145, Sep. 2011, 7 pages.

Disclosed Anonymously, "Method to Monitor a Running Application and Intelligently Recommend Application Upgrades Needed", ip.com, IPCOM000212842D, Nov. 30, 2011, 8 pages.

* cited by examiner

AUTOMATED SOFTWARE PATCH MAPPING AND RECOMMENDATION

BACKGROUND

Aspects of the present invention relate generally to software updates and, more particularly, to automated software patch mapping and recommendations.

Once a company releases commercial software, it is common for the company to receive reports of software defects from customers. After software patches are developed to address the software defects, the company will need to deliver the software patches to their customers, and guide users to install the software patches in the customer's production environment (e.g., user device). In general, there are several ways to guide users to install software patches. One method is to push a new version of the software, containing one or more software patches, to customers for direct download and installation, wherein the customers are notified that the new version of the software addresses one or more software defects. This method is commonly used for mobile applications.

SUMMARY

In a first aspect of the invention, there is a computer-implemented method including: abstracting, by a computing device, test cases for a software patch into a sequence of task operations and parameters associated with each task operation in the sequence of task operations; encoding, by the computing device, the task operations and the parameters associated with each task operation in the sequence of task operations based on predetermined rules, thereby generating encoded task operations with unique identifiers assigned thereto and associated encoded parameters with numeric values assigned thereto; generating, by the computing device using machine learning, a list of frequent operation items, based on the encoded task operations and the associated encoded parameters; generating, by the computing device using clustering, clusters of parameters for each frequent operation item in the list of frequent operation items; and sending, by the computing device, a software patch package including the list of frequent operation items, the clusters of parameters and the software patch to a remote server for distribution to one or more user devices.

In another aspect of the invention, there is a computer program product including one or more computer readable storage media having program instructions collectively stored on the one or more computer readable storage media. The program instructions are executable by a computing device to: determine that a software patch is available to download from a software distribution server; obtain a list of frequent operation items and parameter clusters associated with the software patch from the software distribution server; determine information for a user job executed by the computing device, the information including a sequence of task operations and parameters associated with each task operation in the sequence of task operations; generate a list of frequent operation items for the user job using machine learning, based on the information for the user job; determine whether any frequent operation items in the list of frequent operation items for the software patch match any frequent operation items in the list of frequent operation items for the user job; and send a software patch recommendation to a user based on the determination whether any frequent operation items in the list of frequent operation items for the software patch match any frequent operation items in the list of frequent operation items for the user job.

In another aspect of the invention, there is system including a processor, a computer readable memory, one or more computer readable storage media, and program instructions collectively stored on the one or more computer readable storage media. The program instructions are executable by a computing device to: obtain a list of frequent operation items and parameter clusters associated with an available software patch from a software distribution server; determine information for a user job executed by the computing device, the information including a sequence of task operations and parameters associated with each task operation in the sequence of task operations; generate a list of frequent operation items for the user job using machine learning, based on the information for the user job; determine whether any frequent operation items in the list of frequent operation items for the software patch match any frequent operation items in the list of frequent operation items for the user job; in response to there being a match between one of the frequent operation items in the list of frequent operation items for the software patch and one of the frequent operation items in the list of frequent operation items for the user job, determine a parameter cluster from the parameter clusters associated with the software patch that matches parameters associated with the one of the frequent operation items in the list of frequent operation items for the software patch; in response to there being a match between one of the frequent operation items in the list of frequent operation items for the software patch and one of the frequent operation items in the list of frequent operation items for the user job, determine whether the user job matches the software patch based on the parameter cluster; and in response to determining that the user job matches the software patch, automatically download the software patch from the software distribution server.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
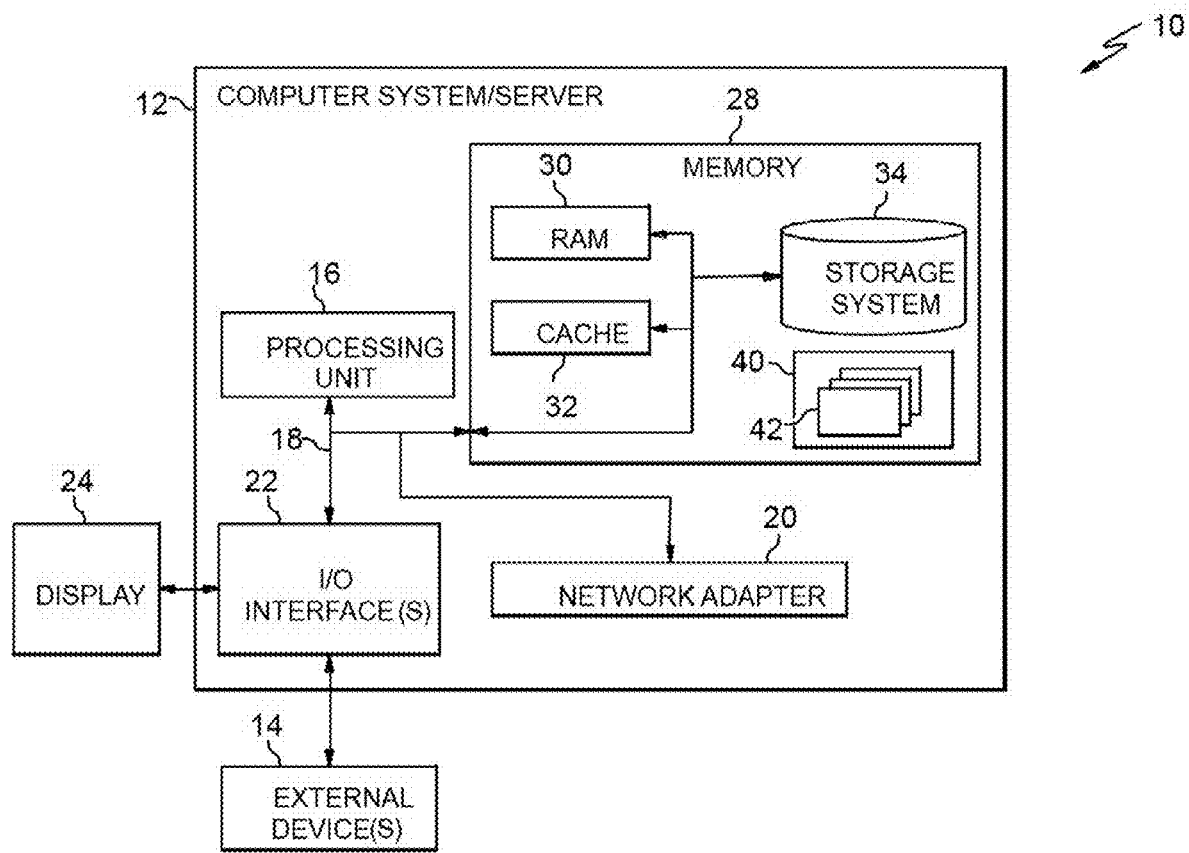
FIG. 1 depicts a cloud computing node according to an embodiment of the present invention.

Aspects of the present invention relate generally to software updates and, more particularly, to automated software patch mapping and recommendations. According to aspects of the invention, when a software patch is released for a software product, a server analyzes the problems addressed by the software patch, and identifies a structured behavior sequence for the software patch. In embodiments, a software distributing server stores software version information for different versions of the software patch (e.g., different test cases), as well as specific problems solved by each version of the software patch, together with behavior and operation steps associated with each version of the software patch (e.g., different versions for different user device environments). In implementations, a user device analyzes use behavior of the software product at issue (e.g., in real time), and determines whether the use behavior is a match for behavior of a software patch stored at the software distribution server. In embodiments, if the user device determines that there is a match between software product behavior at the user device and software patch behavior for a particular version of the software patch, the user device installs the matching software patch to avoid potential failures in the operation of the software product that may occur without the software patch. In implementations, if the user device determines that one or more available software patches is not a match for the software product behavior of a user device, the user device does not install the software patch, and computing costs (e.g., downtime, etc.) associated with the installation of an unnecessary software patch are avoided.

In general, there are several ways to guide users to install software patches. One method is to push a new version of the software to customers for direct download and installation. Another method for installing software patches is typically used for software used in a commercial environment. Commercial software may be complex and/or important to the function of a customer's production environment. Accordingly, it may be impossible or impractical for customers to stop their production environment to install a software patch. In this case, a detailed description of a patch installation may be provided to customers, which informs the customers how to replace software packages required by the software patch step by step.

From a software user's perspective, the user may not encounter problems solved by a new software patch, or may never require the software features addressed by the software patch. Accordingly, the user may not need to install the software patch. In the case of complex commercial software, there may be many steps required to install a software patch, which may lead to installation failure or incomplete installation. Accordingly, the frequent installation of software patches can increase computing costs, as well as communication costs among customers, software technical support and software developers. Thus, minimizing the installation of software patches based on the behavior of a software patch and the actual needs of a user may improve computer functionality by reducing down-time and installation failures/errors.

Embodiments of the invention provide improved software installation methods and systems to address the technical problem of reducing computer down-time and software installation failures/errors. Implementations of the invention provide new functionality enabling the mapping of different software patch test cases to frequent task operations using machine learning. Additionally, embodiments of the invention generate software patch information enabling user devices to determine whether a version of a newly released software patch matches actual software behavior in a particular user environment, and further enabling automated installation of a matching version of a software patch by the user device. The technical problem of reducing the number of unnecessary software patch installations arises solely in the realm of computer technology, and is addressed in embodiments of the invention by packaging software patches with mapping information to enable user devices to determine appropriate software patches for the device's particular software use environment.

In embodiments of the invention, a server finds a series of test cases related to code changes in a software patch (e.g., update), extracts the frequent operations from the test cases, and uses machine learning algorithms to compare the frequent operations inside a user job with the frequent operations found from the test cases related to the software patch, and compares parameters in each frequent operation, to determine if the software patch is desirable or not.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
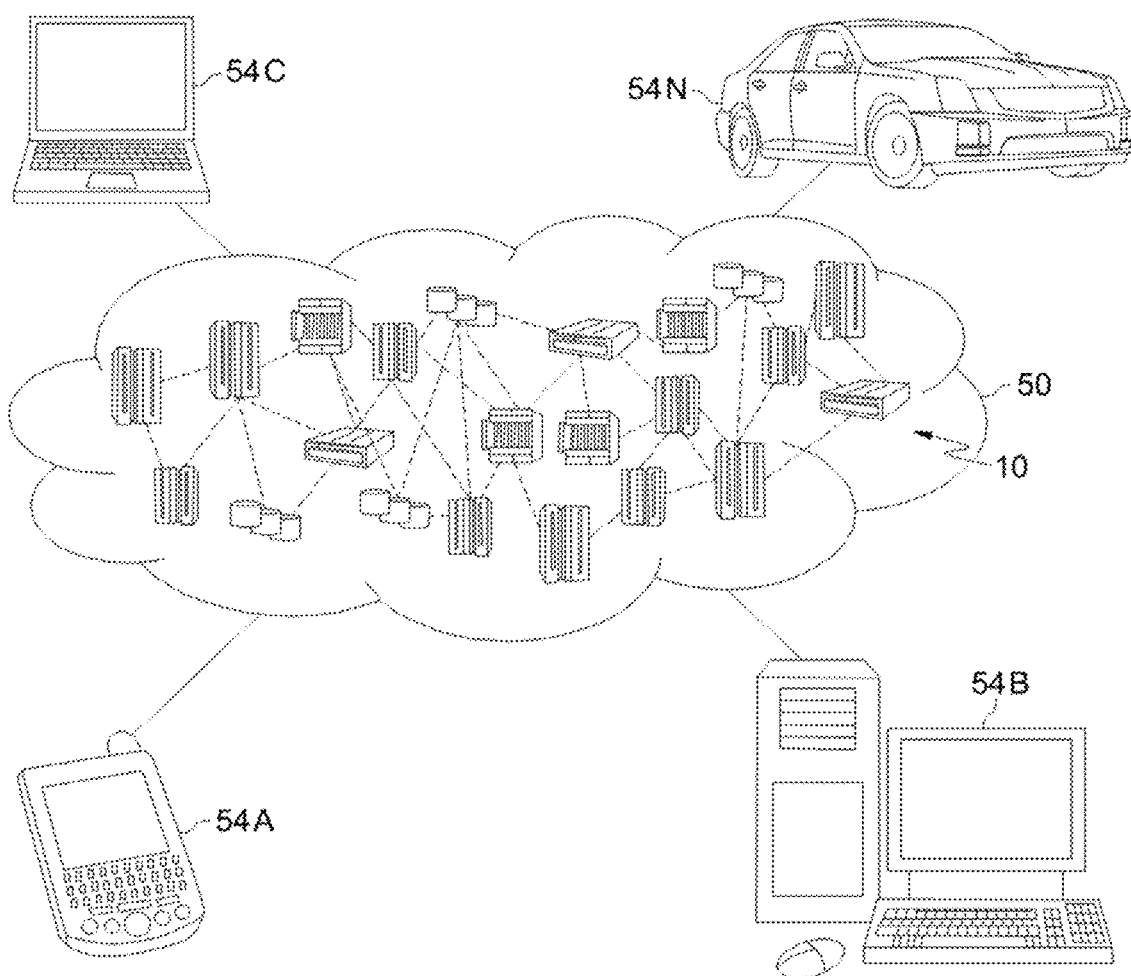
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
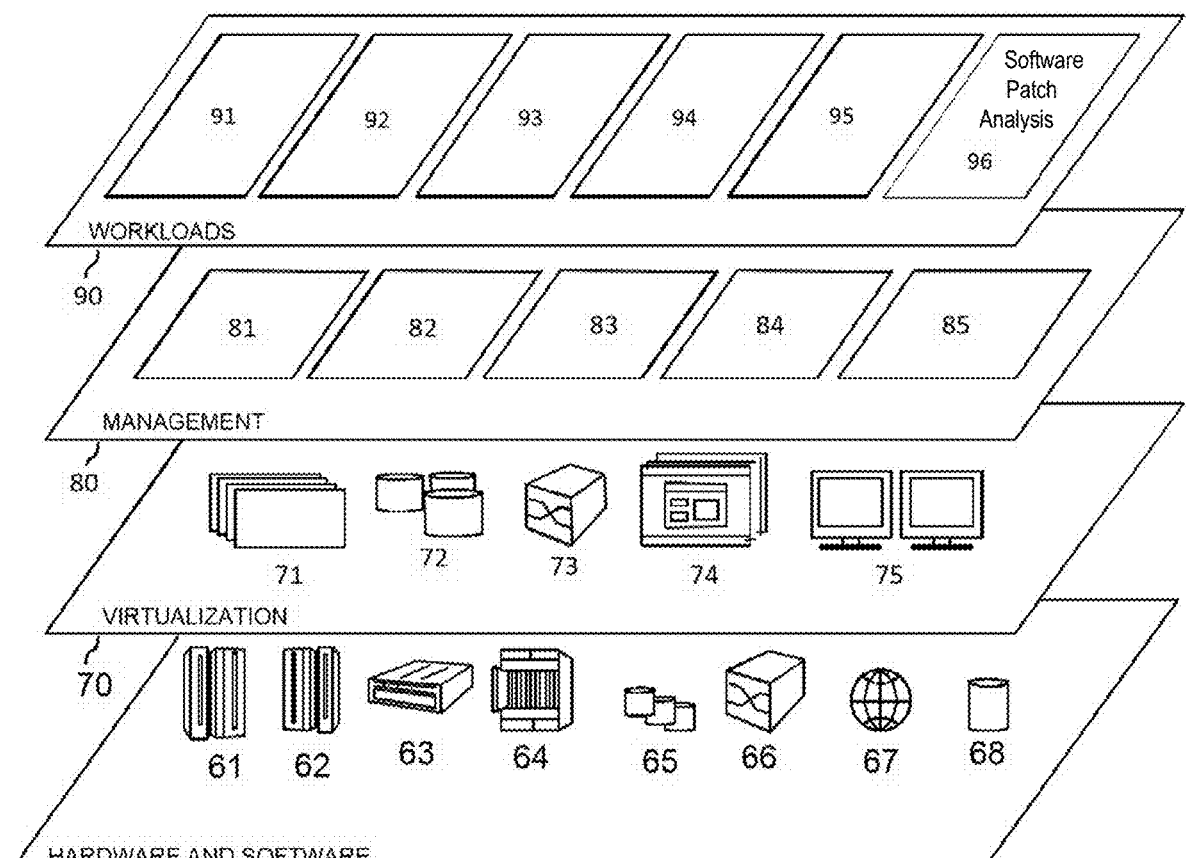
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software patch analysis 96.

Implementations of the invention may include a computer system/server 12 of FIG. 1 in which one or more of the program modules 42 are configured to perform (or cause the computer system/server 12 to perform) one of more functions of the software patch analysis 96 of FIG. 3. For example, the one or more of the program modules 42 may be configured to: abstract test cases for a software patch into a sequence of task operations and parameters associated with each task operation in the sequence of task operations; encode the task operations and the parameters associated with each task operation in the sequence of task operations based on predetermined rules, thereby generating encoded task operations with unique identifiers assigned thereto and associated encoded parameters with numeric values assigned thereto; generate, using machine learning, a list of frequent operation items, based on the encoded task operations and the associated encoded parameters; generate, using clustering, clusters of parameters for each frequent operation item in the list of frequent operation items; and send a software patch package including the list of frequent operation items and the clusters of parameters with the software patch to a remote server for distribution to one or more user devices.

Figure 4:
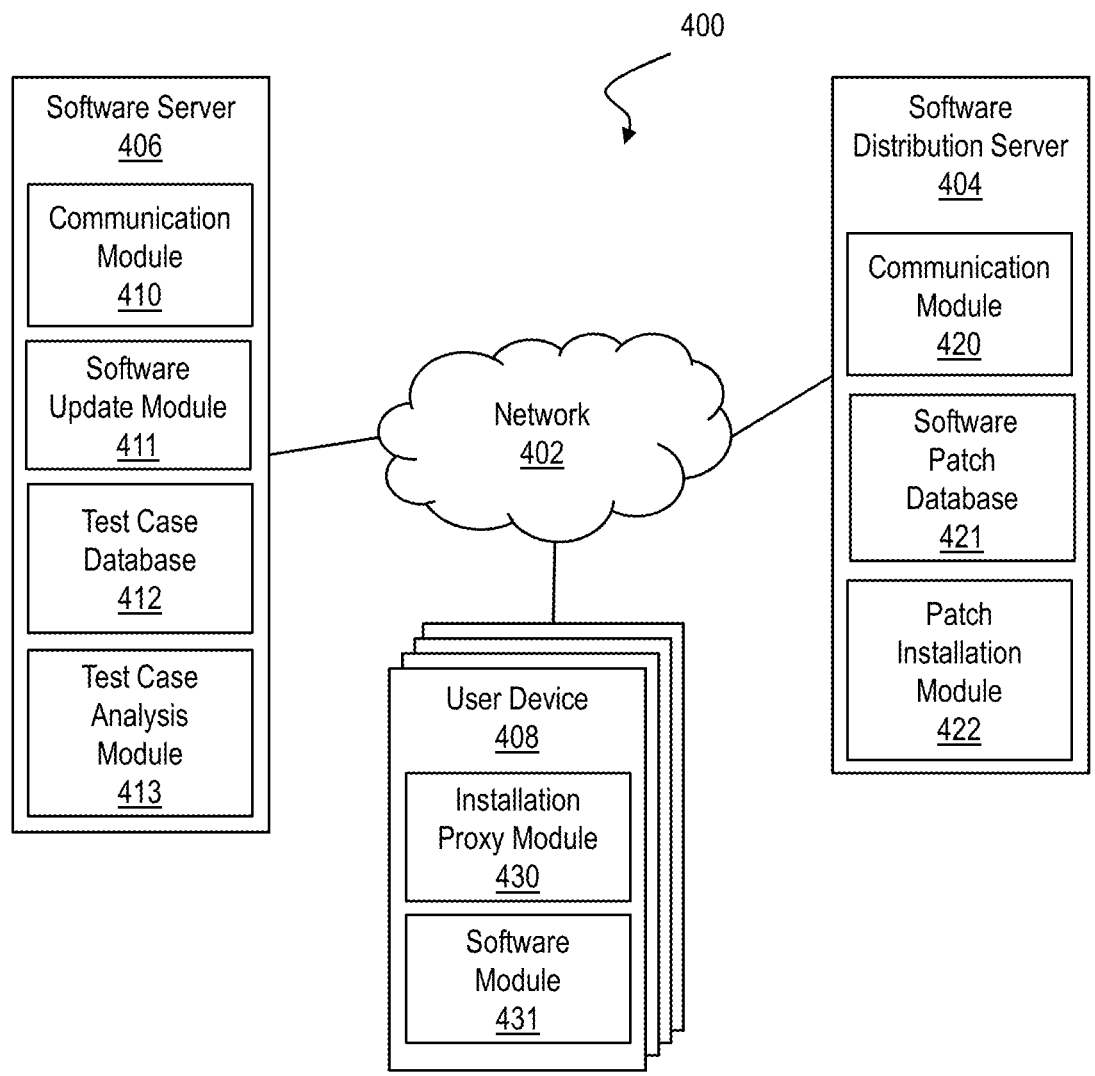
FIG. 4 shows a block diagram of an exemplary environment in accordance with aspects of the invention.

FIG. 4 shows a block diagram of an exemplary software distribution environment 400 in accordance with aspects of the invention. In embodiments, the software distribution environment 400 includes a network 402 enabling communication between a software distribution server 404, a software server 406 and one or more user devices (e.g., user device 408). The software distribution server 404, the software server 406 and each of the one or more user devices 408 may each comprise the computer system/server 12 of FIG. 1, or elements thereof. The software distribution server 404 and the software server 406 may be computing nodes 10 in the cloud computing environment 50 of FIG. 2. The one or more user devices 408 may be local computing devices used by cloud consumers in the cloud computing environment 50 of FIG. 2 (e.g., PDA or cellular telephone 54A, desktop computer 54B, laptop computer 54C, and/or automobile computer system 54N).

In embodiments, the software server 406 comprises one or more modules, each of which may comprise one or more program modules such as program modules 42 described with respect to FIG. 1. In the example of FIG. 4, the software server 406 includes a communication module 410 configured to communicate with the software distribution server 404; a software update module 411 configured to generates test case information for versions of a software patch for a software product at issue, and save the test case information in a test case database 412; and test case analysis module 413 configured to analyze test case data, each of which may comprise one or more program module(s) 42 of FIG. 1, for example.

In embodiments, the software distribution server 404 comprises one or more modules, each of which may comprise one or more program modules such as program modules 42 described with respect to FIG. 1. In the example of FIG. 4, the software distribution server 404 includes a communication module 420 (e.g., including one or more program module(s) 42 of FIG. 1) configured to communication with the software server 406 and one or more user devices 408; a software patch database 421 configured to store multiple versions of software patches for a software product and associated mapping information generated by the software server 406; and a patch installation module 422 (e.g., including one or more program module(s) 42 of FIG. 1) configured to provide software patches to one or more user devices 408 for installation by the user devices 408.

In embodiments, the one or more user devices 408 each include an installation proxy module 430 (e.g., including one or more program module(s) 42 of FIG. 1) configured to determine software product use behavior (e.g., in real time), and determine whether the software product use matches a software patch available through the software distribution server 404. In implementations, the one or more user devices 408 each include a software module 431 (e.g., including one or more program module(s) 42 of FIG. 1) including the software product at issue, which may be selectively updated with the installation of a matching software patch based on the determined use behavior at the particular one or more user devices 408.

The software distribution server 404, software server 406 and one or more user devices 408 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Figure 5:
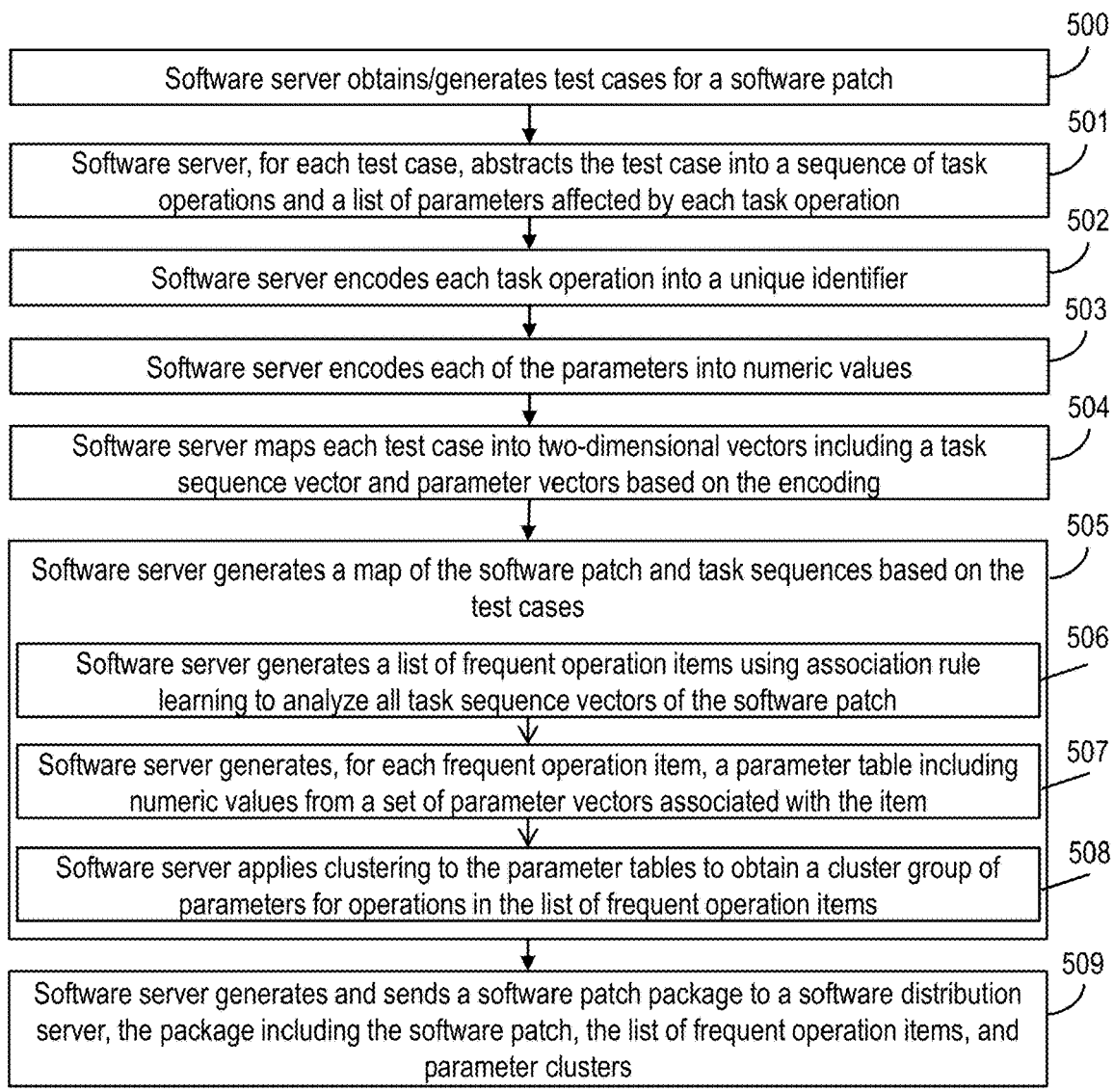
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the software server 406 obtains or generates test cases for a software patch. The term software patch as used herein refers to a set of software code changes for a software product or its supporting data, which is designed to update, fix or improve the software product. The term test case as used herein refers to a testing procedure that executes the installation of a software patch for a particular user environment (execution conditions) by implementing a particular sequence of task operations that affect parameters of the software product or supporting data. Test cases may be generated as part of a software development cycle, and may be used to test a software patch for any problems that may arise from executing the software patch in different user environments or execution conditions. In implementations, the software server 406 (e.g., via the communication module 410) obtains the test cases from a remote provider, such as software development server (not shown). The software server 406 may save test cases obtained at step 500 in the test case database 412. In other implementations, the software update module 411 of the software server 406 generates the test cases. Test cases may be generated that reflect different real-world execution conditions of various user devices (e.g., user devices 408 of FIG. 4). Various methods for generating test cases may be utilized, and the present invention is not intended to be limited to any particular methods for generating test cases. In implementations, the software server 406 obtains or generates multiple test cases, wherein each test case corresponds to different execution conditions.

At step 501, the software server 406 abstracts each test case obtained at step 500 into a sequence of task operations performed by the test case and a list of parameters affected by each of the task operations. For example, the software server 406 may determine that a first test case includes operations 1-10, and that operation 1 affects parameters 1-3, operation 2 affects parameters 1-4, etc. In embodiments, the test case analysis module 413 of the software server 406 implements step 501.

At step 502, for each test case, the software server 406 encodes each task operation into a unique identifier based on predetermined rules. In implementations, each unique identifier is a numeric value. In one example, the software server 406 assigns unique identifying numbers to each operation of a first test case, such that the first operation is assigned the value 1, the second operation is assigned the value 2, and so on. In embodiments, the test case analysis module 413 implements step 502. A table of exemplary encoded values for task operations Op1-Opn is shown below as Table 1.

TABLE 1

Exemplary Encoded Task Operations

| TASK OPERATIONS | ENCODED VALUE |
|---|---|
| Op 1 | 1 |
| Op 2 | 2 |

TABLE 1-continued

Exemplary Encoded Task Operations

| TASK OPERATIONS | ENCODED VALUE |
|---|---|
| Op 3 | 3 |
| ... | ... |
| Op n | n |

At step 503, for each test case, the software server 406 encodes each of the parameters associated with respective task operations with a numeric value based on predetermined rules. The terms encode and encoding as used herein refer to a process of converting data into a format required for later information processing (machine learning) steps by the software server 406, including association rule learning and clustering. In implementations, parameters that already have an associated numeric value (e.g., 0.2, 100, etc.) are assigned that numeric value, while parameters that are associated with a non-numeric value (e.g., high, low, true, false) are assigned a numeric value based on the predetermined rules. In embodiments, the test case analysis module 413 of the software server 406 implements step 503. A table of exemplary encoded values for parameters (Param 1-n) is shown below as Table 2.

TABLE 2

Exemplary Encoded Parameters

| PARAMETERS | TYPE | VALUE | ENCODED VALUE |
|---|---|---|---|
| Param 1 | Numeric | 0.2 | 0.2 |
| Param 2 | Numeric | 100 | 100 |
| Param 3 | Categorical: High - 2 Medium - 1 Low - 0 | High | 2 |
| ... | | | ... |
| Param n | Categorical: True - 1 False - 0 | False | 0 |

At step 504, the software server 406 maps each test case into two-dimensional vectors including a task sequence vector and parameter vectors based on the encoding of steps 502 and 503. In one example, a test case including task operations 1-4 performed in a sequence of 1, 3, 4, 2, results in the software server 406 creating a task sequence vector of [1 3 4 2]. Each set of parameters affected by each respective task operation 1-4 results in a parameter vector. In this example, a first task operation affects the parameters 2.0, "false" and "high", which are encoded to have the numeric values 2.0, 0 and 2. In this case, the software server 406 creates a parameter vector for the first task operation of [2.0 0 2]. In embodiments, the test case analysis module 413 of the software server 406 implements step 504. An exemplary table of vectors generated according to step 504 is shown below as Table 3.

TABLE 3

Exemplary Table of Task Sequence and Parameter Vectors

| VECTOR TYPE | VECTOR AFTER ENCODING |
|---|---|
| Task sequence vector | [1 3 4 2] |
| Parameter vector for Op 1 | [2.0 0 2] |
| Parameter vector for Op 3 | [100 0 0.02 4] |

TABLE 3-continued

Exemplary Table of Task Sequence and Parameter Vectors

| VECTOR TYPE | VECTOR AFTER ENCODING |
|---|---|
| Parameter vector for Op 4 | [20 1] |
| Parameter vector for Op 2 | [40 32 100 0202] |

At 505, the software server 406 generates a map of the software patch and task sequences based on the test cases. In implementations, the software server 406 performs the following substeps to map the software patch and task sequences.

At substep 506, the software server 406 generates a list of frequent operation items (set of frequent operation items) for the software patch at issue by analyzing all task sequence vectors of the software patch's test cases using association rule learning. The term association rule learning as used herein refers to a rule-based machine learning method for discovering interesting relations between variables in databases. In general, association rule learning is intended to identify strong rules discovered in databases using some measures of interestingness. In general, interestingness measures are utilized for selecting and ranking patterns according to their potential interest to a user in data mining. Various methods of association rule learning may be utilized by the software server 406, and the invention is not intended to be limited to any particular method of association rule learning.

The list of frequent operation items may be in the form of a table of operations listed by their unique identifier numbers assigned at step 502, and one or more operations tasks that have been identified as being frequently utilized by the association rule learning. Table 4 below is an example of such a table. In one example, a first test case has a task sequence vector of [1 4 2] and a second test case has a task sequence vector of [1 3 4 2], etc. By applying association rule learning, the software server 406 may determine a list of frequent operation items including items 3 and 3→4, etc., as depicted in Table 4. In embodiments, the test case analysis module 413 of the software server 406 implements substep 506.

TABLE 4

Exemplary List of Frequent Operation Items

| # | FREQUENT ITEMS |
|---|---|
| 1 | 3 |
| 2 | 3 -> 4 |
| ... | ... |
| m | 3 -> 4 -> 2 |

At substep 507, the software server 406 abstracts all parameter vectors associated with each item in the set of frequent operation items to obtain a set of parameter vectors for each of the items, and generates a parameter table including numeric values from the set of parameter vectors. Thus, in embodiments, the software server 406 will generate a parameter table for every frequent operation item in a list of frequent operation items. In one example, one item in a set of frequent operation items is 3→4. The software server 406 determines, for all test cases, parameter vectors (e.g., [100 0 0.02 4] and [20 1]) associated with the item 3→4, and generates a parameter table including numeric values from the parameter vectors. In implementations, the parameter table is a structured table. In embodiments, the test case analysis module 413 of the software server 406 implements step 507. Table 5 below is an exemplary parameter table, wherein values for each parameter vector (e.g., P1) for each task operation (e.g., Op3) are listed.

TABLE 5

Exemplary Parameter Table

| Op3_P1 | Op3_P2 | Op3_P3 | Op3_P4 | Op4_P1 | Op4_P2 |
|---|---|---|---|---|---|
| 100 | 0 | 0.02 | 4 | 20 | 1 |
| 110 | 1 | 0.02 | 2 | 20 | 2 |
| 130 | 0 | 0.1 | 3 | 20 | 2 |

At substep 508, the software server 406 applies a clustering analysis to the parameter tables generated at step 507 to obtain a cluster group for each operation (e.g., Op3, Op4) associated with a frequent operation item (e.g., 3→4). In one example, the software server 406 performs a clustering analysis for the operation 3 (Op 3), and a clustering analysis for the operation 4 (Op4), wherein the parameter table is generated for the frequent operation item 3→4. In implementations, the software server 406 determines a longest distance from a test case point in a cluster to a central point in the cluster, wherein the longest distance may be utilized by user devices to determine whether to recommend/install the software patch. In embodiments, the test case analysis module 413 of the software server 406 implements substep 508. In embodiments, the result of substeps 506-508 is a map of a software patch and task sequences in the form of cluster groups of test cases for each item in a list of frequent operation items. See, for example, the cluster groups shown in FIG. 11, discussed below.

At step 509, the software server 406 generates and sends the software patch package to a software distribution server (e.g., software distribution server 404 of FIG. 4), the software patch package including the software patch, the list of frequent operation items, and associated cluster groups for each item in the list of frequent operation items. Installation information (e.g., instructions) may also be provided in the software patch package for one or more user device environments (e.g., different installation scenarios).

Figure 6:
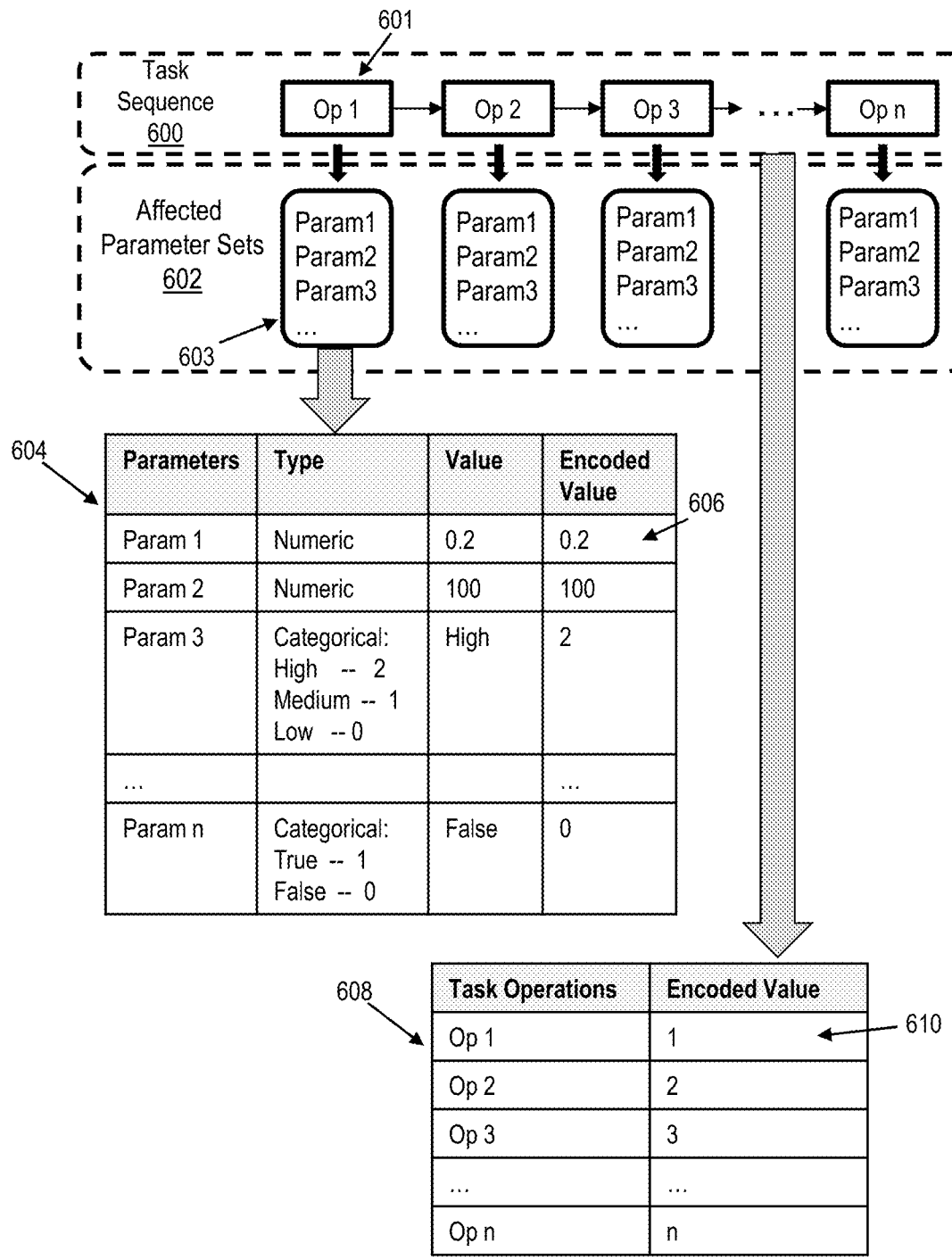
FIG. 6 is a diagram illustrating the encoding of task operations and parameters in accordance with aspects of the invention.

FIG. 6 is a diagram illustrating the encoding of task operations and parameters in accordance with aspects of the invention. In accordance with step 501 of FIG. 5, the software server 406 abstracts the test case into a sequence of task operations (task sequence 600), including task operations 601 (e.g., Op 1, Op 2, Op 3 . . . Op n). The software sever 406 also determines affected parameter sets 602 including, for each task operation 601, a list of parameters (e.g. list 603 including Param1, Param2, Param3) affected by the respective task operation 601. In accordance with steps 502-503 of FIG. 5, the software server 406 generates a table of encoded parameters 604 including encoded values (e.g., 606), and a table of encoded task operations 608 including encoded task operation values (e.g., 610).

Figure 7:
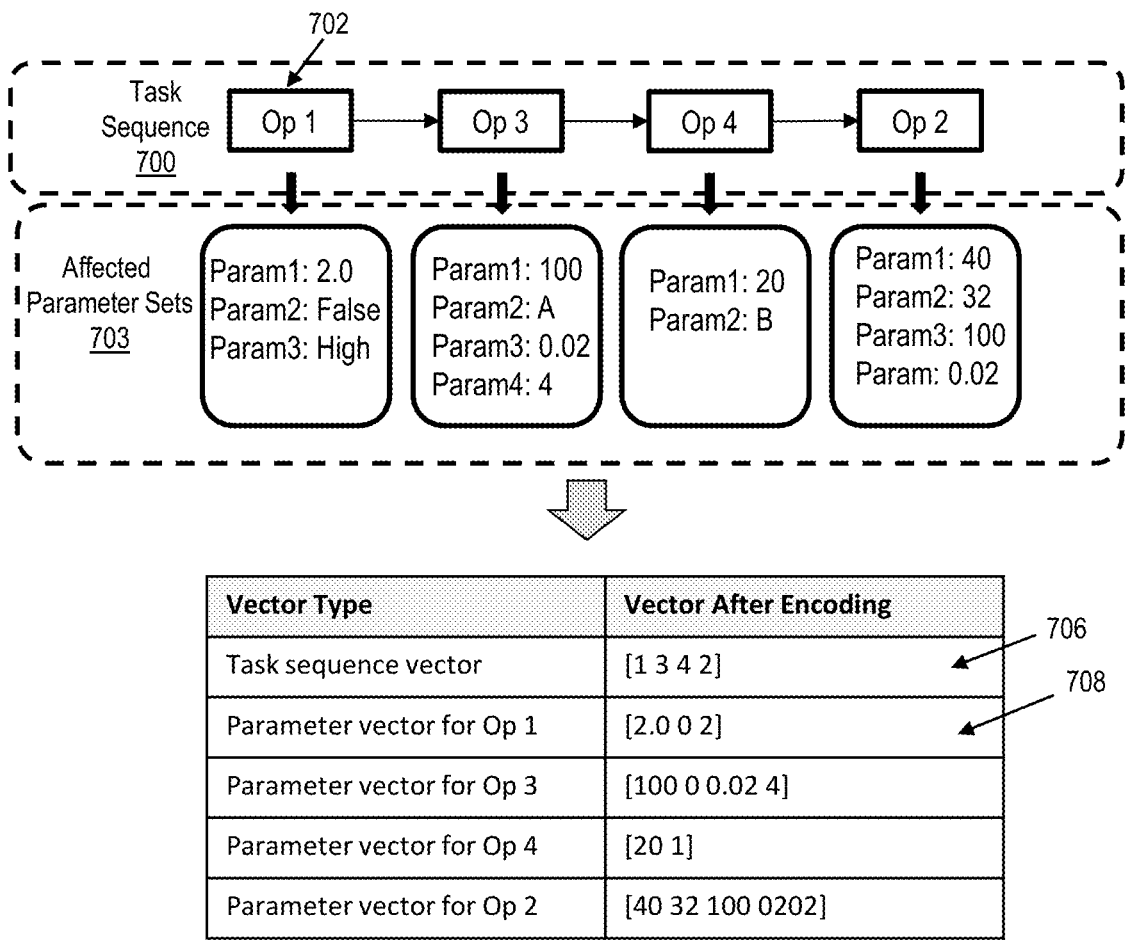
FIG. 7 is a diagram illustrating the mapping of test cases into vectors in accordance with aspects of the invention.

FIG. 7 is a diagram illustrating the mapping of test cases into vectors in accordance with aspects of the invention. In the example of FIG. 7, a task sequence 700 includes task operations 702 in order of performance, including Op 1, Op 3, Op 4, and Op 2. Affected parameters sets 703 are shown, including parameters affected by each task operation (e.g., Param1, Param2, Param3), and associated encoded values (e.g., 2.0, False, High). In accordance with step 504 of FIG. 5, the software server 406 maps each test case into a task sequence vector 706 and parameter vectors (e.g., 708) based on the encoded values (e.g., 606 and 610 of FIG. 6).

Figure 8:
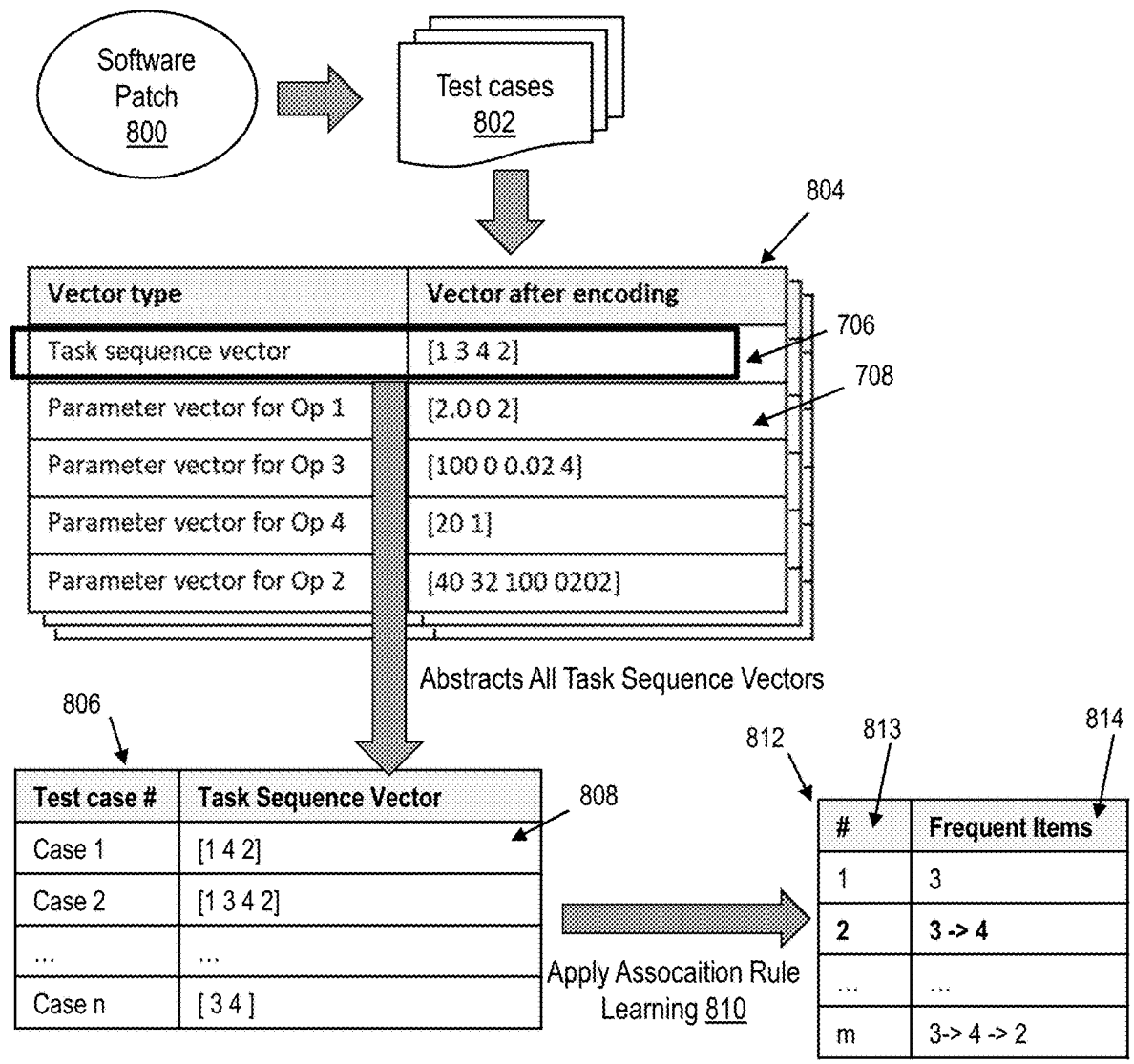
FIG. 8 is a diagram illustrating the generation of a list of frequent operation items in accordance with aspects of the invention.

FIG. 8 is a diagram illustrating the generation of a list of frequent operation items in accordance with aspects of the invention. In the example of FIG. 8, a software patch represented at 800 is associated with a number of test cases 802 generated to test code changes implemented with the software patch. For each test case 802, the software server 406 generates a vector table 804 including a task sequence vector (e.g., 706) and associated parameter vectors (e.g., 708). In the example of FIG. 8, the software server 406 abstracts all task sequence vectors for each test case 802 (e.g., Case 1, Case 2 . . . Case n) and generates a table 806 of task sequence vectors (e.g., 808) for each test case (e.g., Case 1, Case 2, etc.). In accordance with step 506 of FIG. 5, the software server 406 uses association rule learning at 810 to generate a list of frequent operation items 812. In the example of FIG. 8, the list is in the form of a table having a column 813 of test case numbers, and a column 814 of associated frequent operation items.

Figure 9:
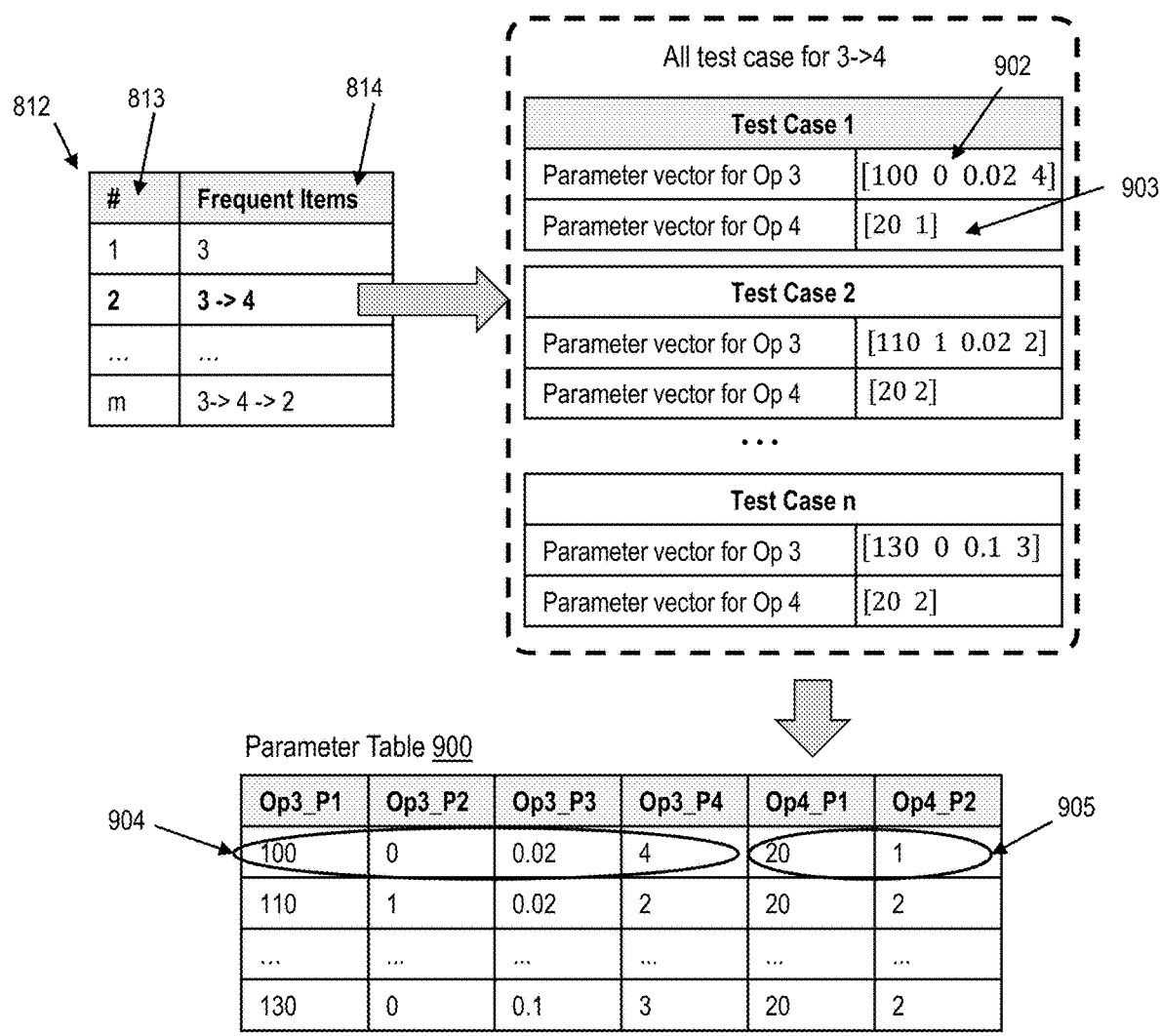
FIG. 9 is a diagram illustrating the generation of a parameter table in accordance with aspects of the invention.

FIG. 9 is a diagram illustrating the generation of a parameter table in accordance with aspects of the invention. In the example of FIG. 9, the software server 406 abstracts all parameter vectors associated with the frequent operation item 3→4 for all test cases (e.g., Test Case 1, Test Case 2 . . . Test Case n) to generate a parameter table 900. The exemplary parameter table 900 includes numeric values from parameter vectors for operations Op 3 and Op 4. See, for example, the numeric values from parameter vector 902 for operation Op 3, and the numeric values from parameter vector 903 for operation Op 4 of Test Case 1, which are reflected at 904 and 905 in the parameter table 900. Thus, each row of the parameter table 900 includes numeric values from the parameter vectors of a particular test case.

Figure 10:
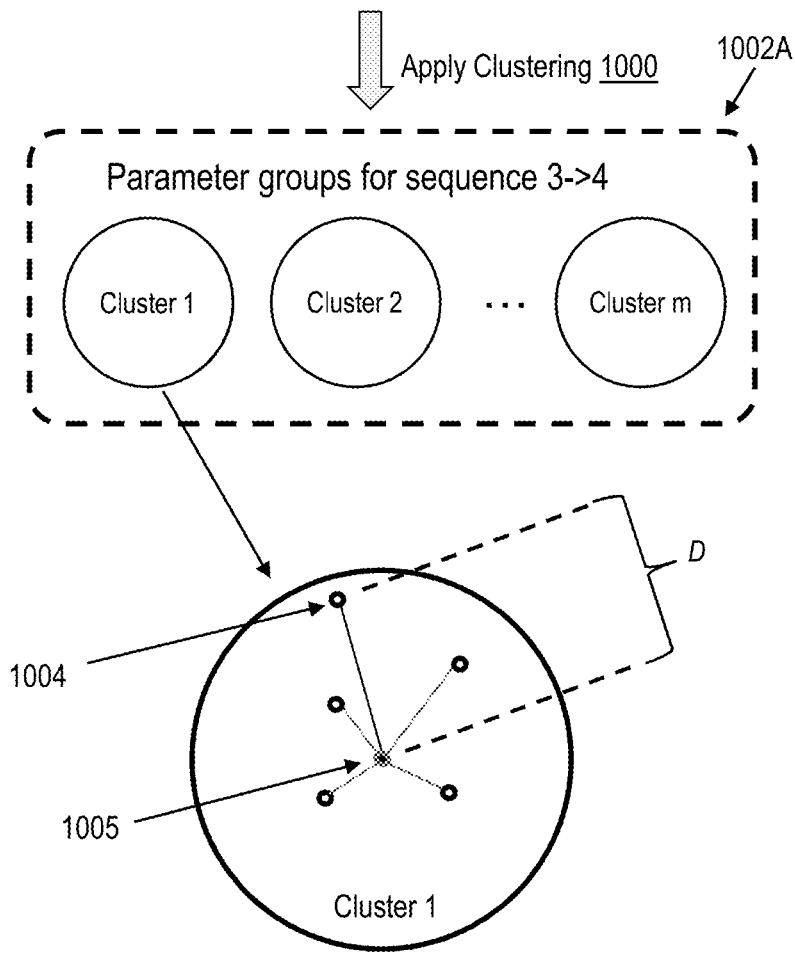
FIG. 10 is a diagram illustrating the generations of cluster groups in accordance with aspects of the invention.

FIG. 10 is a diagram illustrating the generations of cluster groups in accordance with aspects of the invention. In the example of FIG. 10, the software server 406 applies a clustering analysis at 1000 to the parameter table 900 of FIG. 9, to generate parameter groups 1002A for the frequent operation item 3→4. In the example of FIG. 10, the software server 406 applies a clustering to the parameter table 900 according to step 508 of FIG. 5, to generate Cluster 1, and Cluster 2 through Cluster m, wherein each cluster comprises clusters of test case parameter points 1004 around a central point 1005. Using Cluster 1 as an example, the software server 406 determines a longest distance D between the central point 1005 and each of the test case parameter points 1004 in the Cluster 1. This longest distance determination may be made for each of the clusters in the parameter groups 1002A.

Figure 11:
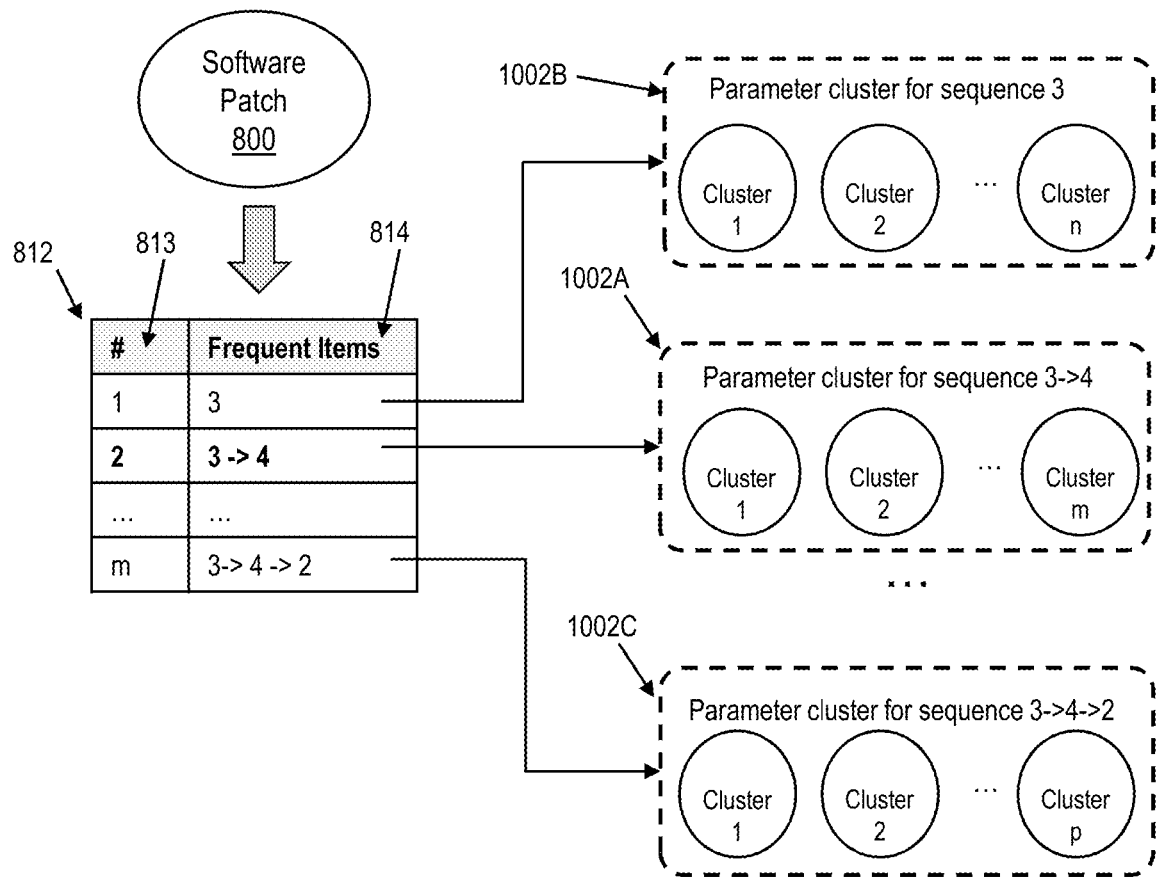
FIG. 11 is a diagram illustrating exemplary cluster groups for a list of frequent operation items in accordance with aspects of the invention.

FIG. 11 is a diagram illustrating exemplary cluster groups for a list of frequent operation items in accordance with aspects of the invention. In the example of FIG. 11, the software server 406 has applied a clustering analysis to generate parameter groups 1002A, 1002B and 1002C for respective frequent operating items 814 of table 812. In this example, the frequent operating item 3 results in the parameter groups 1002B, the frequent operating item 3→4 results in the parameter groups 1002A, and the frequent operating item 3→4→2 results in the parameter groups 1002C.

Figure 12:
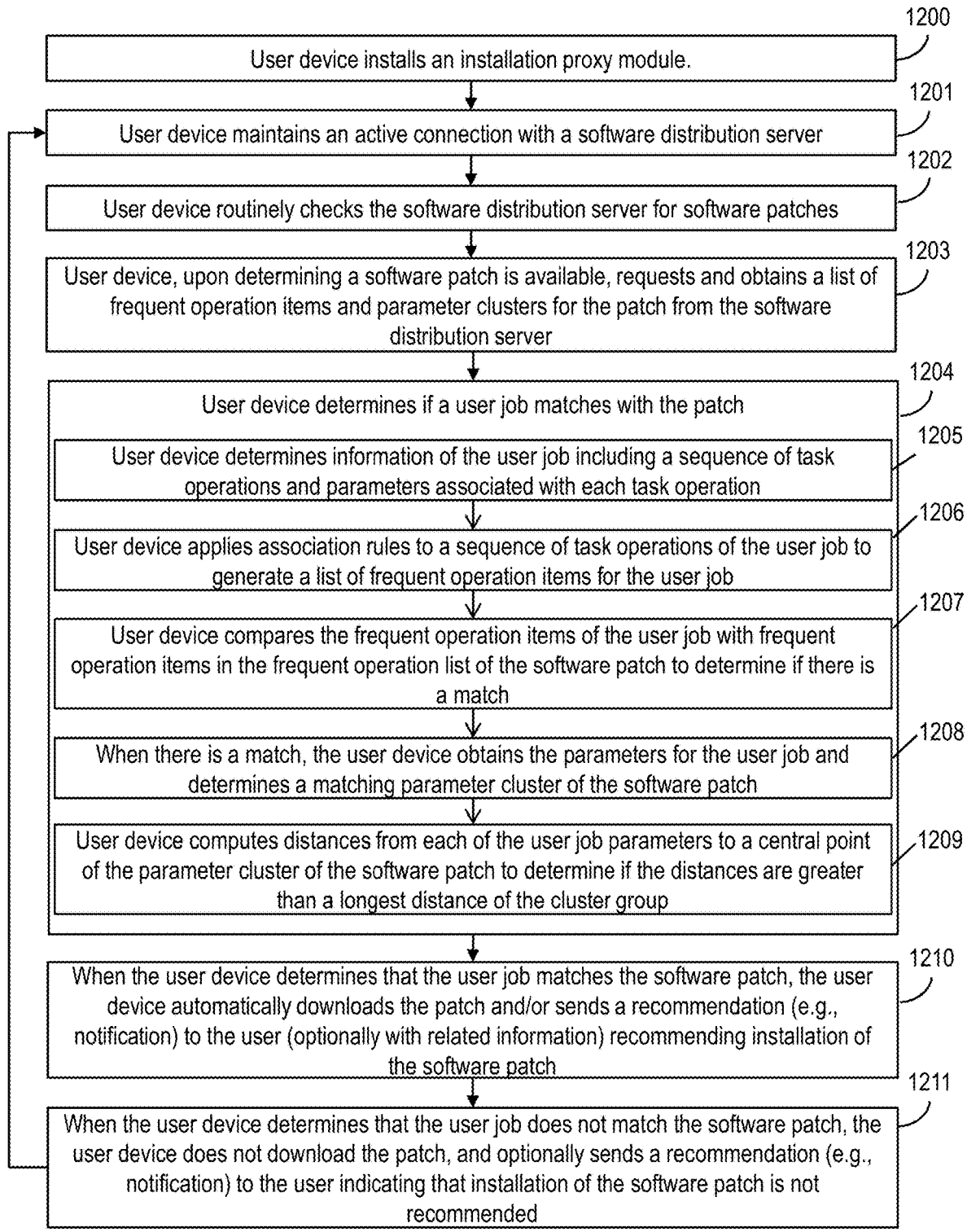
FIG. 12 shows a flowchart of an exemplary method in accordance with aspects of the invention.

FIG. 12 shows a flowchart of an exemplary method in accordance with aspects of the invention. Steps of the method may be carried out in the environment of FIG. 4 and are described with reference to elements depicted in FIG. 4.

At step 1200, a user device 408 installs software for an installation proxy module 430. In implementations, the installation proxy module 430 is installed in/with the user device's existing software product. In embodiments, the user device receives the installation proxy module 430 from the software distribution server 404.

At step 1201, the user device 408 maintains an active connection with the software distribution server 404. In implementations, the installation proxy module 430 of the user device 408 maintains a connection with the communication module 420 of the software distribution server 404.

At step 1202, the user device 408 routinely checks the software distribution server 404 for available software patches (software updates) for an existing software product (e.g., software module 431 of the user device 408 in FIG. 4). It should be understood that the user device 408 may check for software patches for more than one existing software module, however, only one software patch and software product are discussed herein. In embodiments, the installation proxy module 430 of the user device 408 implements step 1202.

At step 1203, upon determining that a software patch is available at step 1202, the user device 408 requests and obtains a list of frequent operation items and parameter clusters from the software distribution server 404 for the available software patch. In embodiments, the installation proxy module 430 of the user device 408 implements step 1203.

At step 1204, the user device 408 determines if a user job of the user device 408 matches the available software patch. The term user job as used herein refers to work executed by the user device that requires one or more task operations that affect one or more parameters. In embodiments, the user device 408 collects information and analyzes the operating steps of the software product at issue. In embodiments, step 1204 is implemented by the following substeps.

At substep 1205, the user device 408 determines information regarding the user job of the user device 408. In embodiments, the information includes a task sequence comprising one or more task operations executed by the user job, and one or more parameters that are affected by the one or more task operations. Various methods of obtaining the information may be utilized. In embodiments, the user device 408 collects the information regarding the user job from a computer log or software configuration data of the software product at issue. The method of obtaining the information is not intended to be limited to the examples herein. In embodiments, the installation proxy module 430 of the user device 408 implements step 1205.

At substep 1206, the user device 408 applies association rules to the task sequence of the user job to obtain a list of frequent operation items in the user job. It should be understood that the user device 408 may utilize methods of FIG. 5 to obtain the list of frequent operation items. That is, the user device 408 may: abstract a user job into a sequence of task operations and a list of parameters affected by each task operation; encode each task operation into a numeric value, encode each parameter into numeric values; map the user job into two-dimensional vectors including a task sequence vector and parameter vectors based on the encoding; and determine the list of frequent operation items using association rule learning to analyze all task sequence vectors of the user job. In embodiments, the installation proxy module 430 of the user device 408 implements substep 1206.

At substep 1207, the user device 408 compares the frequent operation items of the user job with the frequent operation items in the list of frequent operation items for the available software patch to determine if there is a match. In embodiments, the installation proxy module 430 of the user device 408 implements substep 1207.

At substep 1208, when there is matching frequent operation items at substep 1207, the user device 408 determines parameters associated with the frequent operation item of the user device, and determines which parameter cluster of the software patch parameter clusters match with the parameters. In implementations, the user device 408 abstracts all parameter vectors associated with each of the frequent operation items to generate parameter tables, and uses the parameter tables to determine the parameters associated with the matching frequent operating item. In embodiments, the installation proxy module 430 of the user device 408 implements substep 1208.

At substep 1209, the user device 408 computes a distance from each of the parameters (parameter points) of the user job to the central point of the parameter cluster identified at substep 1208 to determine if the distance is greater than a longest distance (see, e.g., distance D of FIG. 13) of the cluster group. In implementations, the user device 408 determines that the user job matches the software patch when the distance from the parameters to the central point in the parameter cluster are all less than or equal to the longest distance of the cluster group. In embodiments, the installation proxy module 430 of the user device 408 implements step 1209.

At step 1210, when the user device 408 determines at step 1204 that the user job matches the software patch, the user device automatically downloads the software patch and/or sends a notification to the user recommending installation of the software patch. In embodiments, the notification includes related information regarding the installation of the software patch (e.g., installation instructions). In implementations, the notification recommends the user install the software patch. In embodiments, the installation proxy module 430 of the user device 408 implements step 1210.

At step 1211, when the user device 408 determines at step 1204 that the user job does not match the software patch (i.e., the frequent operation items of the user job do not match the frequent operation items in the frequent operation list of the software patch and/or the distance from the user job parameters to a central point of the parameter cluster is greater than the longest distance of the cluster group), the user device does not download the available software patch. In implementations, the user device 408 sends a notification to the user indicating that the available software patch is not recommended and/or has not been installed based on the determination that the user job does not match the software patch.

Figure 13:
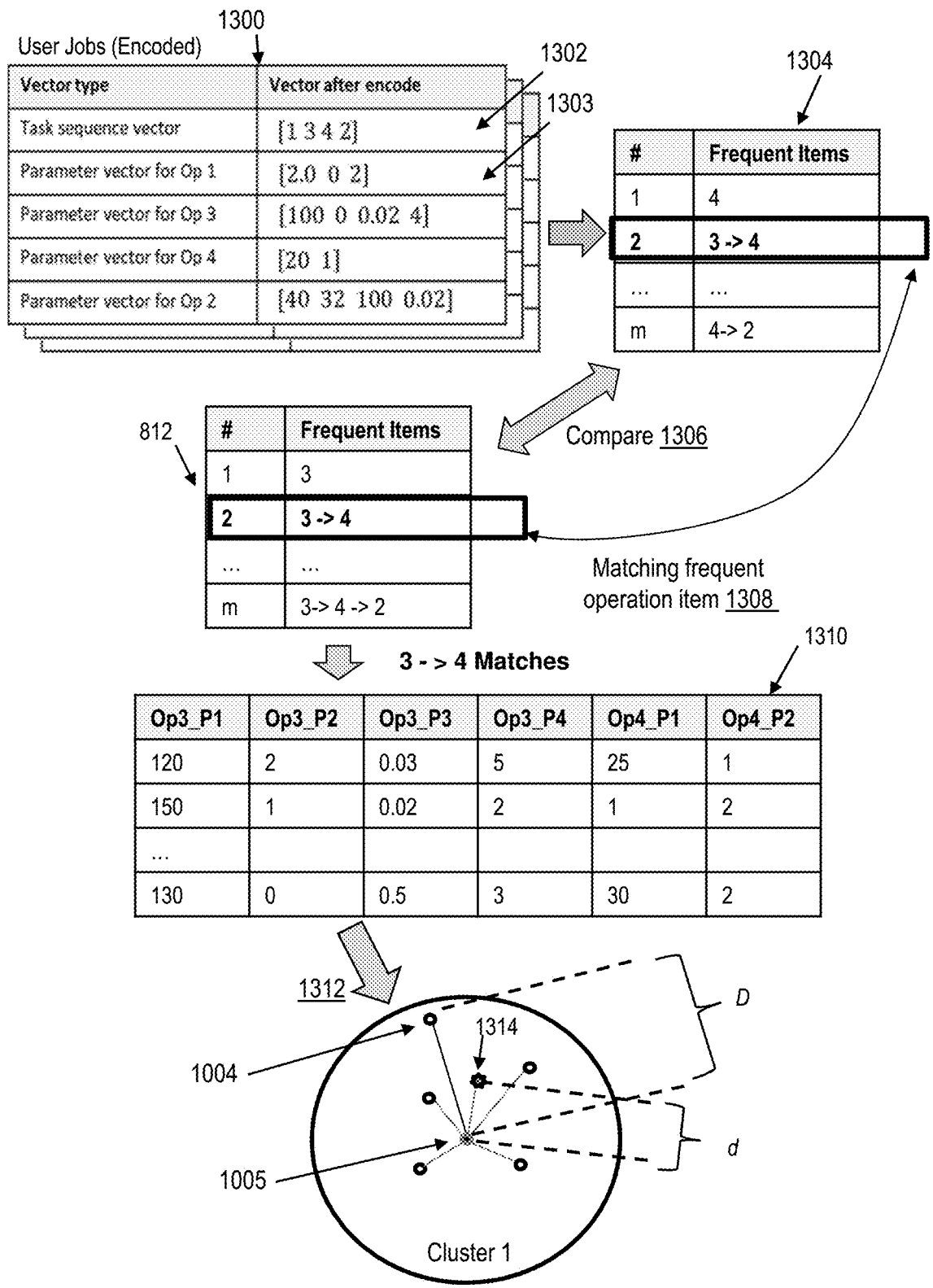
FIG. 13 is a diagram illustrating an exemplary use scenario in accordance with aspects of the invention.

FIG. 13 is a diagram illustrating an exemplary use scenario in accordance with aspects of the invention. Steps of FIG. 12 are reflected in the exemplary use scenario of FIG. 13, and reference elements from FIG. 4. In the example of FIG. 13, the user device 408 generates, for each encoded user job of the user device 408, a vector table 1300 including a task sequence vector 1302 and associated parameter sequence vectors (e.g., 1303). The user device 408 generates a list of frequent operation items 1304 for a user job. At 1306, the user device 408 compares the list of frequent operation items 1304 with a list of frequent operation items 812 of a software patch 800. At 1308, the user device 408 determines that a frequent operation item 3→4 of the list of frequent operation items 1304 matches the frequent operation item 3→4 of the list of frequent operation items 812. The user device 408 then determines the parameters associated with the frequent operation item 3→4 from a parameter table 1310. Next, the user device 408 determines at 1312 if the location for each of the parameters has a distance from the center point 1005 of an associated cluster (e.g., Cluster 1) that is greater than a longest distance D of the cluster. In the example of FIG. 13, the parameters match the parameters in Cluster 1 of the software patch 800. One user job parameter point of the parameter table 1310 shown at 1314, and has a shorter distance d from the center point 1005 than the longest distance D between the parameter point 1004 and the center point 1005. If all parameter points from the table 1310 having distances from the center point 1005 that are less than the longest distance D, then the user device 408 determines that the software patch 800 matches the user job, and proceeds according to step 1210 of FIG. 12.

Based on the above, it can be understood that embodiments of the invention provide a system and method for: mapping a software patch into a set of test cases which cover the code change for the patch; abstracting the task sequence and related parameters for each test case; encoding the information as structured data; and applying machine learning methods (association rule learning and clustering) to discover frequent task sets with common parameters which are related to the software patch. In parameter clustering, the longest distance from the test case points to the central point is added as an auxiliary statistic to each cluster group, which helps a user device judge if the parameters of a user job belongs to a specific cluster group or not. The frequent task sets with the common parameters are delivered with the software patch to an installation server. In embodiments, a patch installation proxy resides in the software product to compare the frequent task sets with the task sequence in the user's software, and then recommend to the user if a patch is required or not.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   abstracting, by a computing device, test cases for a software patch into a sequence of task operations and parameters associated with each task operation in the sequence of task operations;
   encoding, by the computing device, the task operations and the parameters associated with each task operation in the sequence of task operations based on predetermined rules, thereby generating encoded task operations with unique identifiers assigned thereto and associated encoded parameters with numeric values assigned thereto;
   generating, by the computing device using machine learning, a list of frequent operation items, based on the encoded task operations and the associated encoded parameters;
   generating, by the computing device using clustering, clusters of parameters for each frequent operation item in the list of frequent operation items; and
   sending, by the computing device, a software patch package including the list of frequent operation items, the clusters of parameters and the software patch to a remote server for distribution to one or more user devices.

2. The method of claim 1, further comprising generating, by the computing device, the test cases for the software patch, wherein each test case reflects a different software execution environment for the software patch and includes different task operations, sequence of task operations, or parameters associated with each of the different task operations.

3. The method of claim 1, wherein generating the list of frequent operation items comprises:
   mapping, by the computing device, each test case into a task sequence vector and parameter vectors based on the encoded task operations and the associated encoded parameters for each of the test cases; and
   analyzing, by the computing device, all task sequence vectors of the test cases using association rule learning to generate the list of frequent operation items.

4. The method of claim 3, wherein the generating the clusters of parameters for each frequent operation item in the list of frequent operation items comprises:
   generating, by the computing device, a parameter table for each frequent operation item in the list of frequent operation items, including numeric values from the parameter vectors associated with the respective frequent operation items, wherein the clustering is performed for each of the parameter tables to obtain the clusters of parameters for each frequent operation item in the list of frequent operation items.

5. The method of claim 1, further comprising determining, by the computing device, for each of the clusters of parameters, a longest distance between any parameter point in a respective cluster and a central point of the respective cluster, wherein the longest distance provides a threshold value for a user device to determine whether the software patch is a match for a user job of the user device.

6. The method of claim 5, wherein the software patch package includes the determined longest distance for each of the clusters of the parameters.

7. The method of claim 1, wherein the computing device includes software provided as a service in a cloud environment.

8. A computer program product comprising one or more computer readable storage media having program instructions collectively stored on the one or more computer readable storage media, the program instructions executable by a computing device to:
  determine that a software patch is available to download from a software distribution server;
  obtain a list of frequent operation items and parameter clusters associated with the software patch from the software distribution server;
  determine information for a user job executed by the computing device, the information including a sequence of task operations and parameters associated with each task operation in the sequence of task operations;
  generate a list of frequent operation items for the user job using machine learning, based on the information for the user job;
  determine whether any frequent operation items in the list of frequent operation items for the software patch match any frequent operation items in the list of frequent operation items for the user job; and
  send a software patch recommendation to a user based on the determination whether any frequent operation items in the list of frequent operation items for the software patch match any frequent operation items in the list of frequent operation items for the user job.

9. The computer program product of claim 8, wherein the program instructions are further executable to determine that the user job does not match the software patch when there is not a match between the frequent operation items in the list of frequent operation items for the software patch and the frequent operation items in the list of frequent operation items for the user job, and the recommendation is a recommendation to not install the software patch when the user job does not match the software patch.

10. The computer program product of claim 8, wherein the program instructions are further executable to:
  determine there is a match between one of the frequent operation items in the list of frequent operation items for the software patch and one of the frequent operation items in the list of frequent operation items for the user job;
  determine a parameter cluster from the parameter clusters associated with the software patch that matches parameters associated with the one of the frequent operation items in the list of frequent operation items for the software patch; and
  determine whether the user job matches the software patch based on the parameter cluster, wherein the sending the software patch recommendation to the user is further based on the determining whether the user job matches the software patch based on the parameter cluster.

11. The computer program product of claim 10, wherein the program instructions are further executable to:
  compute distances from each of the parameters associated with each task operation in the sequence of task operations of the user job and a central point in the parameter cluster; and
  determine if any of the distances are greater than a longest distance of the software patch parameters in the parameter cluster and the central point,
  wherein the determining whether the user job matches the software patch based on the parameter cluster includes:
  in response to at least one of the distances from one of the parameters of the user job and the central point being greater than the longest distance, determining that the software patch does not match the user job; and
  in response to none of the distances from the parameters of the user job and the central point being greater than the longest distance, determining that the software patch matches the user job.

12. The computer program product of claim 10, wherein the program instructions are further executable to automatically download the software patch from the software distribution server.

13. The computer program product of claim 12, wherein the downloading the software patch includes downloading installation information, and the recommendation to the user provides the installation information to the user.

14. A system comprising:
  a processor, a computer readable memory, one or more computer readable storage media, and program instructions collectively stored on the one or more computer readable storage media, the program instructions executable by a computing device to:
  obtain a list of frequent operation items and parameter clusters associated with an available software patch from a software distribution server;
  determine information for a user job executed by the computing device, the information including a sequence of task operations and parameters associated with each task operation in the sequence of task operations;
  generate a list of frequent operation items for the user job using machine learning, based on the information for the user job;
  determine whether any frequent operation items in the list of frequent operation items for the software patch match any frequent operation items in the list of frequent operation items for the user job;
  in response to there being a match between one of the frequent operation items in the list of frequent operation items for the software patch and one of the frequent operation items in the list of frequent operation items for the user job, determine a parameter cluster from the parameter clusters associated with the software patch that matches parameters associated with the one of the frequent operation items in the list of frequent operation items for the software patch;
  in response to there being a match between one of the frequent operation items in the list of frequent operation items for the software patch and one of the frequent operation items in the list of frequent operation items for the user job, determine whether the user job matches the software patch based on the parameter cluster; and
  in response to determining that the user job matches the software patch, automatically download the software patch from the software distribution server.

15. The system of claim 14, wherein the program instructions are further executable to send a notification to a user of the computing device recommending installation of the software patch.

16. The system of claim 14, wherein the program instructions are further executable to determine that the user job does not match the software patch as a result of there not being a match between one of the frequent operation items in the list of frequent operation items for the software patch and one of the frequent operation items in the list of frequent operation items for the user job.

17. The system of claim 14, wherein generating the list of frequent operation items for the user job using machine learning, based on the information for the user job comprises:

encoding the task operations and the parameters associated with each task operation in the sequence of task operations of the user job based on predetermined rules, thereby generating encoded task operations of the user job with unique identifiers assigned thereto and associated encoded parameters of the user job with numeric values assigned thereto;

generating task sequence vectors of the user job and parameter vectors of the user job based on the encoded task operations and the associated encoded parameters; and analyzing the task sequence vectors of the user job using association rule learning to generate the list of frequent operation items for the user job.

18. The system of claim 14, wherein the program instructions are further executable to:

compute distances from each of the parameters of the user job and a central point in the parameter cluster and determine if any of the distances are greater than a longest distance of the software patch parameters in the parameter cluster and the central point, wherein the determining whether the user job matches the software patch based on the parameter cluster includes:

as a result of at least one of the distances from one of the parameters of the user job and the central point being greater than the longest distance, determining that the software patch does not match the user job; and as a result of none of the distances from the parameters of the user job and the central point being greater than the longest distance, determining that the software patch matches the user job.

19. The system of claim 14, wherein the program instructions are further executable to routinely check the software distribution server to determine whether one or more software patches are available for download by the computing device.

20. The system of claim 14, wherein the program instructions are further executable to:

determine that the user job does not match the software patch as a result of there not being a match between one of the frequent operation items in the list of frequent operation items for the software patch and one of the frequent operation items in the list of frequent operation items for the user job; and send a notification to a user indicating installation of the software patch is not recommended based on the determining that the user job does not match the software patch.

* * * * *